M. H. ANDERSON.
AEROPLANE PROPULSION MEANS.
APPLICATION FILED JUNE 15, 1920.

1,395,695.

Patented Nov. 1, 1921.

INVENTOR.
MERRITT H. ANDERSON
BY Bradley L. Benson
ATTORNEY

UNITED STATES PATENT OFFICE.

MERRITT H. ANDERSON, OF ANTIOCH, CALIFORNIA.

AEROPLANE PROPULSION MEANS.

1,395,695.　　　　　Specification of Letters Patent.　　　Patented Nov. 1, 1921.

Application filed June 15, 1920. Serial No. 389,507.

*To all whom it may concern:*

Be it known that I, MERRITT H. ANDERSON, a citizen of the United States of America, residing at Antioch, in the county of Contra Costa and State of California, have invented certain new and useful Improvements in Aeroplane Propulsion Means, of which the following is a specification.

This invention relates to a new, novel and useful improvement in aeroplane propulsion means.

The principal object of this invetnion is to enable an aeroplane to be driven by two propellers employing but a single engine.

Another object is to devise means whereby the propellers of an aeroplane may be driven at aeroplane speed while the engine driving the same works at a low speed. It is a well known fact that high speed motors are short lived, and it is my object to produce an arrangement whereby I may employ a low speed which low speed will be conducive of long life.

It is common knowledge that aeroplane motors often fail, causing accidents. It is also well known that automobile engines will work for hours and days without trouble, and it is my object to make the aeroplane as safe as an automobile by producing an arrangement wherein the engine will be as reliable as an automobile engine.

Other objects and advantages will be seen as the description proceeds.

In this specification and the annexed drawings, the invention is illustrated in the form considered to be the best, but it is to be understood that the invention is not limited to such form, because it may be embodied in other forms and it is also to be understood that in and by the claim following the description, it is desired to cover the invention in whatever form it may be embodied.

In the drawings.

Referring to the drawings, like numerals refer to corresponding parts in several views.

Figure 1:
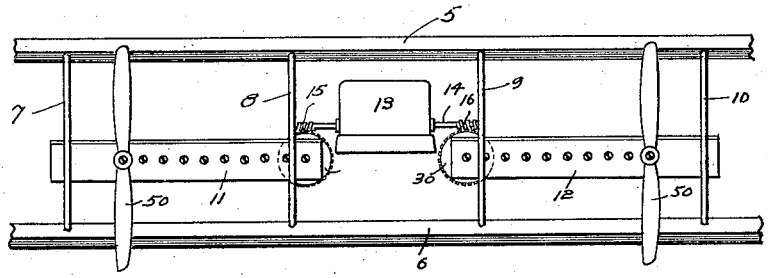
Figure 1 is a front elevation of an aeroplane having my gearing arrangement mounted thereon.
Figure 2:
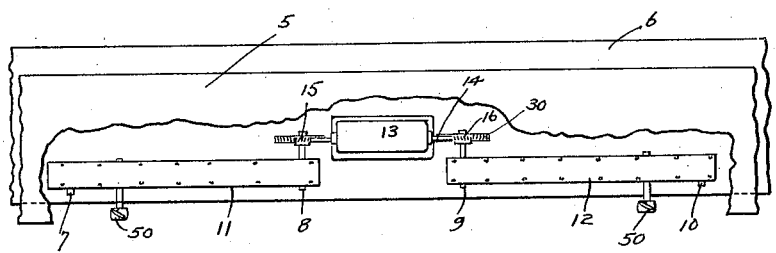
Fig. 2 is a top plan view of Fig. 1, partly broken away, to show my gear arrangement.

Numerals 5 and 6 refer to the planes of an ordinary biplane aeroplane, and the numerals 7, 8, 9 and 10 refer to struts separating the planes. This construction is merely diagrammatical for the purpose of illustrating my invention more fully.

The numerals 11 and 12 refer to gear cases which extend parallel to the planes 5 and 6 and spaced therefrom. These gear cases are preferably supported by the struts but it is obvious that they may be supported in any convenient manner.

The numeral 13 refers to a motor of a slow speed type having a shaft 14 carrying a worm 15 at one end and a worm 16 at the opposite end. As the arrangement of parts is identical in both gear cases, I will describe but one, for the purpose of simplifying this specification.

Figure 3:
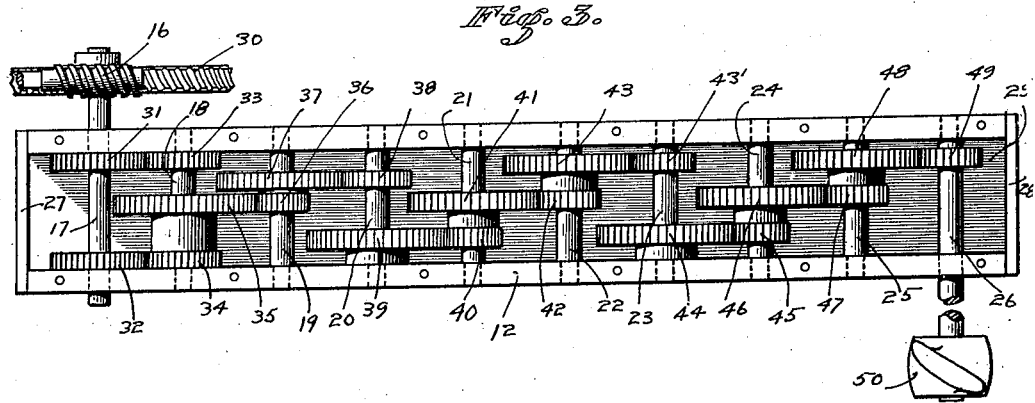
Fig. 3 is a detail view of my gear arrangement.

Referring to Fig. 3 it will be noted that the gear case 12 is formed of two longitudinal members which serve to journal a series of shafts 17 to 26; and that this gear case is provided with ends 27 and 28 and a bottom 29. This forms a trough within which gears mounted upon the shafts 17 to 26 are incased. This construction allows of the storage of a quantity of lubricant which will at all times keep the gears lubricated as will be hereinafter described.

It will be noted that the shaft 17 extends through the sides of the gear case so formed, and is provided with a worm gear 30, which is adapted to mesh with the worm 16. This shaft 17 carries gears 31 and 32 which gears in turn mesh with gears 33 and 34 carried upon the shaft 18. The shaft 18 also has a gear 35 secured thereto which gear meshes with a gear 36, mounted upon the shaft 19. A gear 37 also mounted upon the shaft 19 meshes with a gear 38 mounted upon the shaft 20 and a gear 39 in turn meshes with a gear 40 mounted upon a shaft 21. A gear 41 also carried upon the shaft 21 meshes with a gear 42 carried upon the shaft 22. A gear 43 also mounted upon the shaft 22 meshes with a gear 43′ mounted upon a shaft 23. The gear 44 also carried upon the shaft 23 meshes with a gear 45 carried upon the shaft 24. A gear 46 also carried upon the shaft 24 meshes with a gear 47 carried upon the shaft 25. A gear 48 also carried upon the shaft 26 meshes with a gear 49. This shaft 26 protrudes through the side of the casing and carries a propeller 50 upon this projecting end. It will be noted that the gears mounted upon the shafts 17 to 26 inclusive are so arranged that a speed increase is secured from the shaft 17 toward the shaft 26 with the result that as the shaft 17 revolves once, the shaft 26 will revolve at a much higher speed and in the present illustration it will be (1 to 384). It is obvious, however, that the speed increase can be regulated by regulating the size of the gears with relation to each other. A suitable cover is secured to the gear case for the purpose of protecting the gears, but the same also serves the purpose of retaining the lubricant within the casing.

It will thus be seen that I have produced an arrangement whereby I have been enabled to maintain a propeller speed necessary in the proper course of an aeroplane, but at the same time, I have reduced the engine speed through my arrangement, the advantages of which will be obvious to those skilled in the art.

Having described my invention, what I claim as new and novel is:

In an aeroplane driving means a low speed engine, said engine having a shaft extending therethrough, worm gears mounted on the opposite ends of said shaft, gear casings extending from said engine in opposite directions, a series of parallel shafts mounted within said casings, a propeller mounted upon the end of one of said shafts of each casing and speed increasing gears mounted upon said shafts within said casings, said speed increase being in the direction from the engine toward said propellers.

In testimony whereof I affix my signature.

MERRITT H. ANDERSON.